United States Patent [19]
Benedikt et al.

[11] Patent Number: 5,199,303
[45] Date of Patent: Apr. 6, 1993

[54] PRESSURE SENSOR FOR DETERMINATION OF PRESSURE IN THE COMBUSTION CHAMBER OF AN INTERNAL COMBUSTION ENGINE

[75] Inventors: Walter Benedikt, Kornwestheim; Johann Konrad, Tamm; Matthias Küssel, Korntal-Münchingen; Wolfgang Schmidt, Vaihingen/Enz; Josef Tosch, Schweiberdingen; Manfred Vogel, Ditzingen Heimerdingen; Werner Herden, Gerlingen, all of Fed. Rep. of Germany

[73] Assignee: Robert Bosch GmbH, Stuttgart, Fed. Rep. of Germany

[21] Appl. No.: 726,297

[22] Filed: Jul. 5, 1991

[30] Foreign Application Priority Data

Jul. 18, 1990 [DE] Fed. Rep. of Germany ....... 4022781
Feb. 7, 1991 [DE] Fed. Rep. of Germany ....... 4103706

[51] Int. Cl.$^5$ ............................ G01L 7/08; G01L 9/06
[52] U.S. Cl. ........................................ 73/727; 73/706; 73/708; 73/756; 338/4; 338/42
[58] Field of Search ................. 73/706, 708, 726, 727, 73/720, 721, DIG. 4, 754, 756, 862.65, 862.67, 115; 338/4, 42

[56] References Cited

U.S. PATENT DOCUMENTS

| | | | |
|---|---|---|---|
| 3,204,463 | 9/1965 | Taber | 73/862.65 |
| 4,567,395 | 1/1986 | Pundarika | 73/115 |
| 5,095,741 | 3/1992 | Bartig et al. | 73/115 |

*Primary Examiner*—Donald O. Woodiel
*Attorney, Agent, or Firm*—Michael J. Striker

[57] ABSTRACT

A pressure sensor for determination of pressure in a combustion chamber of an internal combustion engine, particularly for motor vehicles has a housing, a membrane associated with the housing, a sensor element, a plunger supplying a pressure to be determined to the sensor element and located in the housing. The housing has at least one housing opening and a shaft and the membrane closing the opening of the housing and is connected with the shaft of the housing in the region of a side wall so that a bottom of the membrane is flexible and a pressure to be determined is transferable to the plunger, a counter bearing for the plunger. A support is provided for a hybrid and composed of ceramic material and located on the counter bearing for the plunger. The sensor element is a piezoresistive measuring element and located on the hybrid so as to produce an electrical signal corresponding to the pressure.

4 Claims, 1 Drawing Sheet

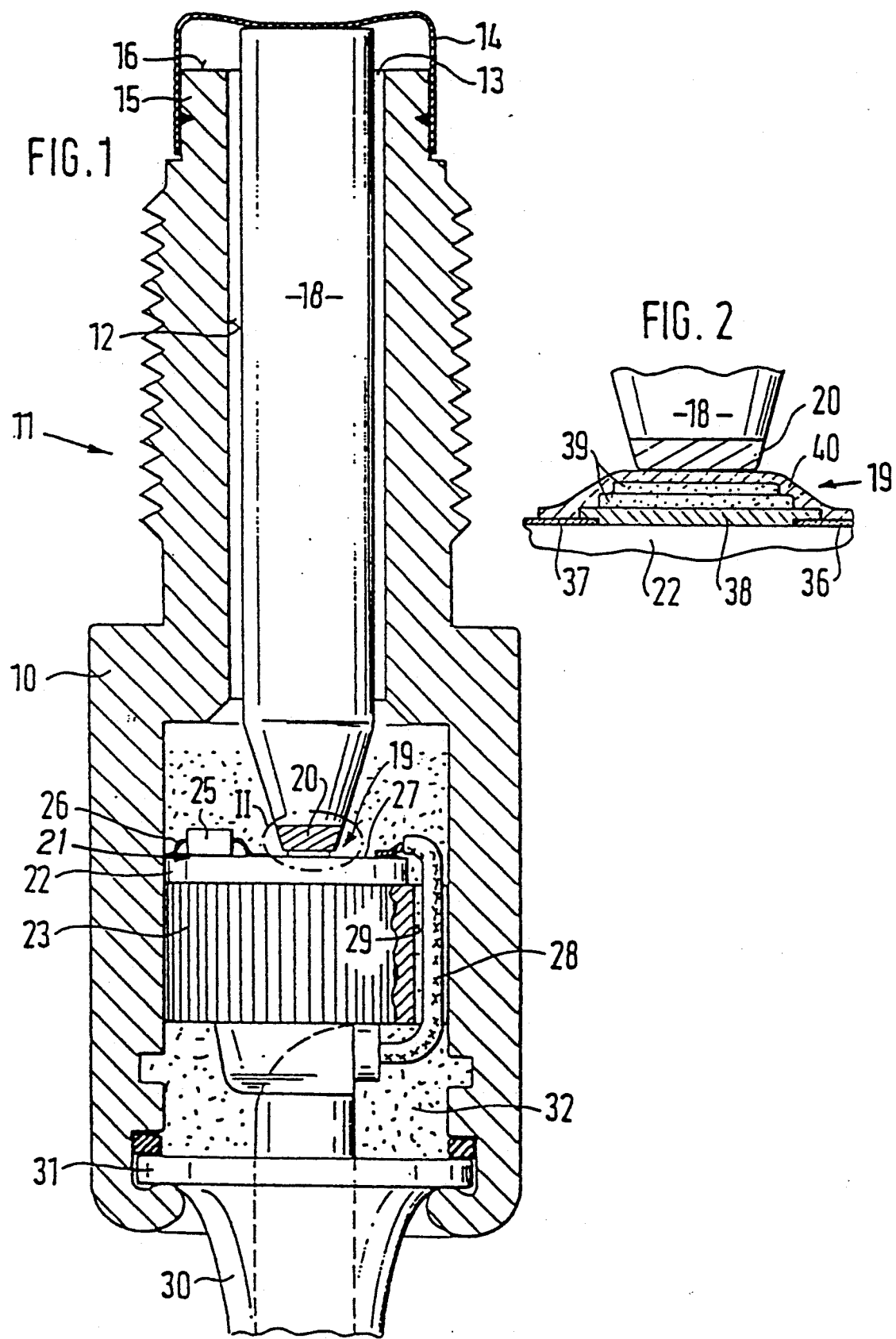

PRESSURE SENSOR FOR DETERMINATION OF PRESSURE IN THE COMBUSTION CHAMBER OF AN INTERNAL COMBUSTION ENGINE

BACKGROUND OF THE INVENTION

The present invention relates to a pressure sensor for determination of pressure in a combustion chamber of internal combustion engines.

Pressure sensors of the above mentioned general type are known in the art, for example from German document DE-OS 3,125,640.6. In this pressure sensor the piezoresistive measuring elements, such as for example thick film resistors of cermet, contactive plastic or metal are applied on a support. The resistance element and the support are arranged as close as possible to the pressure chamber to determine the pressure which acts in it. Furthermore, the measuring signal is supplied by electrical conductors to an electronic evaluating circuit arranged outside the housing of the pressure sensor. For this purpose the piezoresistive elements and the electronic structural parts must be connected with one another by means of screened conduits which are quite expensive. Since the piezoresistive measuring element is directly subjected to the pressure, it is also subjected to high temperatures which act in the combustion chamber. The flame expands there with a temperature of approximately 2,000° C., and pre-tensioning in the housing can occur. Thereby the pressure signal is distorted due to the high temperatures.

Another pressure sensor is disclosed in European patent document EO-OS 85,111,895.0. Here the thick film resistor is arranged on the bottom of a support. This pressure sensor is however provided only for the determination of the pressure in distributing pumps. The high temperature which acts in the combustion chamber would also distort the measuring signal.

U.S. Pat. No. 4,645,965 describes a pressure sensor in which the measuring element is composed of a piezoelectric material. This piezoelectric element is arranged in a housing which has an opening facing the combustion chamber. The opening is closed by a membrane, and the piezoelectric element is in operative communication through a plunger with a membrane and thereby the pressure acting in the combustion chamber. The piezoelectric element abuts against a shoulder in the housing. Due to the use of the piezoelectric element structural differences are produced. In general it is required to operate the measuring element in a potential-free manner. Thereby it is required, in addition to both necessary contact discs for the piezoelectric element, to provide a further isolating disc between the contact disc and the counter bearing. The contacting of the piezoelectric ceramic discs is possible only by expensive welding of wires with the contact discs or by making a cavity in the plunger. Since the piezoelectric element must be used as a discrete structural part it is relatively expensive. Furthermore, several expensive adhesive locations are required, which also distort the measuring signal. In the normal situation four adhesive points are needed for a piezoelectric disc and two contact discs. In a potential-free sensor five adhesive points are needed. Due to the measuring principle used here, the plunger must be glued perpendicularly on the piezoelectric element. Piezoelectric elements have a disadvantageous, relative temperature course of the measuring sensitivity which can be within 15% and 70% of the utilized temperature region. The aging over the service life amounts to typically to 2%-10%. The hysteresis of the piezoceramic of 5-25% is very high and limits the accuracy of the combustion chamber measurements. In particular the multi-layer structure of the piezoelectric arrangement requires a relatively expensive and complicated insertion in the housing of the pressure sensor. With the piezoelectric elements, in contrast to the piezoresistive elements, during the action of pressure for producing the measuring signal, a charge and thereby a voltage is produced. This voltage is detected and evaluated. In contrast, with the piezoresistive elements a voltage is provided, and the electrical resistance in the piezoresistive element is changed due to the pressure which acts in this case.

SUMMARY OF THE INVENTION

Accordingly, it is an object of the present invention to provide a pressure sensor which avoids the disadvantages of the prior art.

In keeping with these objects and with others which will become apparent hereinafter, one feature of the present invention resides, briefly stated, in a pressure sensor, in which a plunger is arranged between a membrane and a sensor element in a housing, and at least one housing opening is closed with respect to the pressure to be determined by the membrane which is cup-shaped, the cup-shaped membrane is welded to the shaft of the housing in the region of the side walls and is flexible in its bottom so as to transfer the pressure to be determined to the plunger, the sensor element is a piezoresistive measuring element and arranged on a support of a hybrid of a ceramic material which is located on a counter bearing for the plunger, and an electrical signal corresponding to pressure is produced by the measuring element.

When the pressure sensor is designed in accordance with the present invention, the piezoresistive measuring elements are potential-free in principle, when they are provided on an isolating substrate. Thereby no additional structural features are required. Furthermore, a piezoresistive measuring element includes only one layer. If a thick film resistance is used as the piezoresistive element, it can be printed in an especially simple and extremely price-favorable standard technology. For this purpose printing on the contacting conductor path is possible and the conductor path can be soldered to the connecting conductors. In contrast to the piezoelectric effect, with the piezoresistive elements no adhesive points are needed. For preventing sliding during the mounting, eventually an adhesive layer can be provided between the substrate and the counter bearing. Without high structural expenses, a homogenous force-transmission to the piezoresistive elements can be obtained. By a simple impressing of a soft plunger tip on the thick film resistance, a uniform force transmission is possible through the total loaded surface of the thick film resistance. No additional extensive adjustment is needed.

Piezoresistive elements especially cermet-thick film resistors have a low temperature course of the measuring sensitivity which can amount only between 5% and 10% over the total utilized temperature region. The aging over the service life of the piezoresistive element is very low and lies under 2%. Furthermore, the piezoresistive elements have approximately no hyteresis, it is under 1%. With the use of the piezoresistive elements, the roughness occurring on the end of the plunger can be compensated in a simple manner. With the use of relatively soft material for the plunger, especially with the use of a soft material for the end of the plunger which faces the piezoresistive element a uniform force transmission over the total contact region is provided.

In accordance with another feature of the present invention the cup membrane during mounting on an opening of the housing is mechanically exactly adjusted to the piezoresistive element.

Still another feature of the present invention is that the measuring element is formed as a thick film resistance.

In accordance with still another feature of the present invention, the thick film resistance is composed of cermet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a section of a pressure sensor in accordance with the present invention; and FIG. 2 is a view showing a fragment of the pressure sensor in accordance with the present invention.

DESCRIPTION OF THE PREFERRED EMBODIMENTS

A pressure sensor for determination of pressure in a combustion chamber of an internal combustion engine is identified as a whole with reference numeral 11. The pressure sensor 11 has a housing identified as 10. The housing has a central, throughgoing and stepped opening 12. The opening 12 of the housing 10 has an opening portion 13 which faces the combustion chamber and is closed by a membrane 14.

The membrane 14 is formed as a so-called cap membrane. The edge of the membrane 14 is bent and fitted over the end of a shaft 15 of the housing 10 and welded there. The membrane 14 is therefore fixed to the housing 10. At the same time in order to insure a movability of the membrane 14, it does not abut directly against an end side 16 of the shaft 15. The bending region of the membrane 14 is therefore freely movable. The membrane 14 is welded to the shaft 15 in the region of its edge.

It is especially advantageous when the membrane 14 is composed of a superalloy, or in other words of an alloy which for example includes approximately 50% Ni, 20% Cr, 20% Fe. A plunger 18 abut against the central region of the membrane 14. The plunger at its another end abuts against a piezoresistive measuring element 19. The piezoresistive measuring elements are such elements which change their resistance value under the action of pressure. For example, a thick film resistors can be used. For this purpose such materials as cermet, conductive plastic or metal can be utilized. The measuring element 19 is pressed or glued on a support 22 of a hybrid 21. A hybrid is normally a support composed of an $Al_2O_3$ substrate with printed circuit parts such as for example resistors and conductor parts, etc. with semiconductors such as integrated circuits applied on the support and connected with circuit parts for example by bonding wires.

The plunger 18 is composed of glass ceramic to insure a high thermal insulation between the membrane, or in other words between the pressure chamber in which the pressure is to be determined and the piezoresistive measuring element. The plunger end which faces the hybrid 21 can be conical, so that its end substantially corresponds to the diameter of the measuring element 19. Thereby it is possible to guide the plunger 18 in the opening 12. However, the region of the pressure transmission is limited, to the size of the measuring element 19. The support 22 of the hybrid 21 abuts further against a counter bearing 23 which is pressed in the opening 12.

The conical shape of the end of the plunger 18 can be necessary in order to approximately determine the overlapping surfaces of the piezoresistive measuring element 19 and the end of the plunger 18 relative to one another. If to the contrary, the whole plunger is reduced as to its diameter, the plunger can eventually break when the pressure is applied. In order to insure a maximum possible definite force transmission from the plunger to the piezoresistive measuring element 19, the plunger 18 is composed of a relatively soft material at least in the end region 20. It is thereby possible that the surface roughness of the plunger end does not act as a measuring error in the piezoresistive measuring element 19, since a form-locking connection is obtained between the end surface of the plunger end and the surface of the piezoresistive measuring element.

Furthermore, it is also possible to make the whole plunger 18 of soft material. However, in this case the rigidity of the plunger 18 is negatively affected. During the selection of the material for the plunger 18 it is necessary to take into consideration that the plunger must have a minimum possible thermal conductivity, so that the measuring signals cannot be distorted by temperature fluctuations or under the action of the temperature. For example glass ceramic has a sufficiently low thermal conductivity. The region 20 of the plunger 18 can be composed of for example of a relatively soft metal, such as for example aluminum, brass, copper, synthetic plastic material, etc. The material for the region 20 must not have the low thermal conductivity.

Electronic structural elements 25 of the evaluation circuit, such as for example resistors, transistors, etc., are located, in addition to the piezoresistive measuring element 19, at the same side of the support of the hybrid 22. The electronic semi-conductor structure parts 25 and the piezoresistive measuring element 19 are connected by bonding wires 26 and thick film conductor paths 27. The output of the preparation circuit leads through a conductor 28 to a not shown evaluation circuit and control device of the internal combustion engine. For this purpose the counter bearing 23 has a throughgoing opening 29 which extends approximately axis-parallel to the opening 12, and a leakage conductor 28 extends through it. The conductor 28 is mounted in a funnel 30 of a cover 31 which closes the opening 12. For protecting against damaging environmental influences, such as for example moisture, the opening 12 in the region of the piezoresistive measuring element 19 and the electronic structural parts 25, and in the region between the counter bearing 22 and the cover 31 is cast with a casting mass 32.

Instead of the opening 29, also a segment for passing the conduit 28 can be cut out on the counter bearing 23. The counter bearing 23 can however be screwed in an opening 12 of the housing 10.

FIG. 2 shows the inventive construction of the piezoresistive measuring element. A first conductor path 26 and a second conductor path 37 are printed on the support 22 of hybrid 21 from Al$_2$O$_3$ substrate. Between both conductor paths 36 and 37, a first resistance layer 38 is printed. The ends of the resistance path 38 overlap with the ends of both conductor paths 36 and 37 to produce an electric contact. Several further resistance paths are printed on the first resistance path 38 in a plurality of layers. These further resistance paths are arranged so that they form a pyramid. In other words in the direction upwards the resistances in form of the layers are shorter and shorter so as not to cover or overlap the edge region. The total pyramid-shaped arrangement of the resistor paths 38 and 39 and at least the end of the conductor paths are covered with a glass layer, for example, of glass paste, to obtain an electrical isolation. The end of the plunger 18 is located with its region 20 on the glass layer 40 or the last resistance path 38 so that the plunger 18 is arranged substantially centrally only on this resistance path 39. This means that the force is supplied exclusively in the region of the uppermost resistance layer and force leaks are avoided.

For an especially homogenous force supply to the piezoresistive element 19 the plunger 18 must have a soft tip 20 composed for example of aluminum, brass, copper, synthetic plastic material, etc. with this soft tip 20 the plunger 18 is pressed onto the piezoresistive element 19 and especially onto the glass layer 40. The pressure must be greater than the pressure to be determined later. For this purpose a multiple of the maximum pressure can be applied to the membrane and the plunger or during pressing-in of the counter bearing 23 the predetermined position can be deliberately overpressed. Thereby impressing of the soft plunger end is obtained.

It is also possible, instead of the single piezoresistive measuring element with a pyramid-shaped construction, additionally to arrange a further piezoresistive measuring element on the hybrid 21 or four measuring elements. In this case the resistance elements are connected with one another in a Wheatstone semi-bridge circuit or complete bridge circuit. One or both or two of four piezoresistive measuring elements are then loaded by the plunger 18 with pressure, while the other piezoresistive measuring element or both other measuring elements are arranged as close as possible in the region of the first or both first piezoresistive measuring elements but not loaded with pressure. It is thereby possible to provide a temperature compensation, without using additional electronic structural elements for compensation of temperature fluctuations in the evaluation circuit.

The different resistance paths 38 and 39 can be pressed in the direction or transversely to the direction of the current which flows through the resistance paths.

Due to the inventive arrangement of the piezoresistive structural elements 19, especially good measuring values are possible. Furthermore, due to the arrangement of the structural elements 25 on a hybrid 22 an especially simple mounting of the pressure sensor 11 is possible. The piezoresistive element 19, the electronic structural parts 28 and the counter bearing 23 with the leakage conduits 28 can be mounted as a structural unit. Outside of the housing 10 of the pressure sensor 11, the structural parts 28 and the piezoresistive measuring element 19 can be tested as to their operability. During the end mounting it suffices only to insert the premounted, tested unit from the opening 12 into the housing 10 provided with the plunger, until the plunger abuts against the membrane 14. Since the counter bearing 23 is pressed in the housing 10, the unit is easily centered and fixed in the housing 10.

It will be understood that each of the elements described above, or two or more together, may also find a useful application in other types of constructions differing from the types described above.

While the invention has been illustrated and described as embodied in a pressure sensor for determining pressure in a combustion chamber of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure sensor for determination of pressure in a combustion chamber of an internal combustion engine, particularly for motor vehicles, comprising a housing; a membrane associated with the housing; a sensor element; a plunger extending between said membrane and said sensor element so as to supply a pressure to be determined from said membrane to said sensor element and located in said housing, said housing having at least one housing opening and a shaft and said membrane closing said opening of said housing and being connected with said shaft of said housing in the region of a side wall so that a bottom of said membrane is flexible and a pressure to be determined is transferable to said plunger from said bottom of said membrane and then transferable through said plunger to said sensor element; a counter bearing for said plunger; a support provided for a hybrid and composed of ceramic material and located o said counter bearing for said plunger, said sensor element being a piezoresistive measuring element and located on said hybrid so as to produce an electrical signal corresponding to the pressure, aid membrane being formed as a cup-shaped membrane, so that during mounting of said cup-shaped membrane on said opening of said housing, it is exactly mechanically adjusted to said piezoresistive measuring element.

2. A pressure sensor as defined in claim 1, wherein said cup-shaped membrane is welded to said shaft in region of the side wall.

3. A pressure sensor as defined in claim 1, wherein said measuring element is a thick film resistor.

4. A pressure sensor as defined in claim 5, wherein said thick film resistor is composed of a cermet.

* * * * *